UNITED STATES PATENT OFFICE.

WALTER PFLEIDERER, OF LONDON, ENGLAND.

REFRIGERATING APPARATUS.

1,250,218.  Specification of Letters Patent.  Patented Dec. 18, 1917.

Application filed March 1, 1915. Serial No. 11,315.

*To all whom it may concern:*

Be it known that I, WALTER PFLEIDERER, a subject of the King of Great Britain and Ireland, and residing at Kingsway House, Kingsway, London, W. C., England, have invented certain new and useful Improvements in Refrigerating Apparatus, of which the following is a specification.

This invention relates to improvements in refrigerating apparatus of the ammonia or like absorption type, of the class in which the ammonia or other medium does not complete a cycle of the apparatus.

Hitherto with apparatus of this nature it has been usual to form the generator-absorber from two cylinders or vessels arranged one within the other but with such an arrangement it has been found impossible to secure a sufficiently rapid absorption of the medium, and it is the principal object of the present invention to overcome this difficulty and thus considerably increase the efficiency of the apparatus.

The invention consists in forming the generator-absorber from two cylinders or vessels arranged at different levels and connected together by one or more pipes or tubes extending from the lower part of the upper vessel and into the lower vessel at a point adjacent to the lower part thereof, the gas outlet being situated in the lower vessel.

The invention also consists in the provision of means for obviating the collection of water or other medium employed for absorption in the receiver and refrigerating coil or for rapidly and effectively removing any water or other absorbent medium that may have collected therein and returning same to the generator.

The invention still further comprises other details and arrangements hereinafter more particularly referred to.

The accompanying drawings illustrate two modes for carrying out the invention.

Fig. 2 is a side elevation of the apparatus shown in Fig. 1, while

Figure 1:
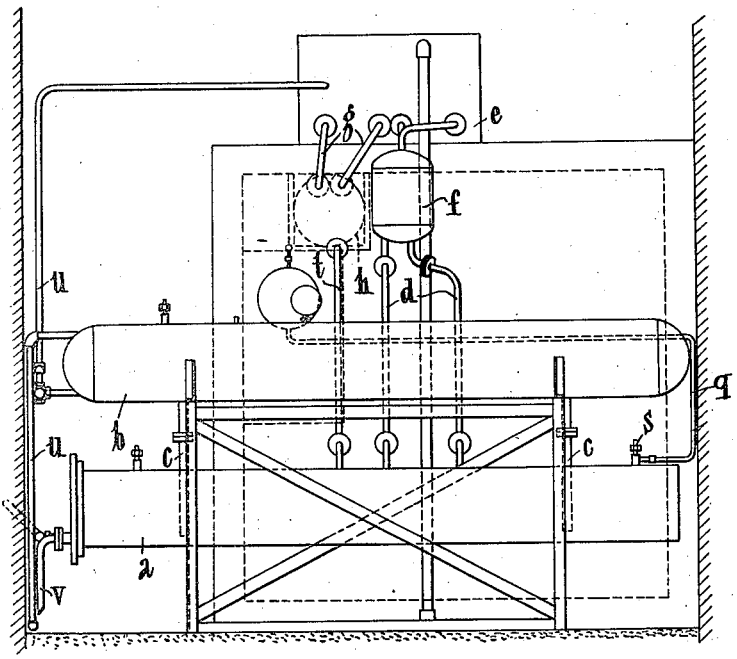
Figure 1 is a front elevation showing one convenient form of apparatus constructed and arranged in accordance with the invention.

In carrying my invention into effect in one convenient manner when applying it, for example, to an ammonia absorption apparatus I form the generator-absorber from a pair of cylindrical or other vessels $a$ $b$ arranged one above the other and connected with one another by one or more pipes $c$ which extend from the lower part of the upper vessel $b$ into the lower vessel at a point adjacent the bottom thereof and, if necessary or desirable, the lower vessel, which is adapted to be steam-heated, for example by steam passing through the pipe $v$, or to be heated by a gas or oil burner or other suitable means may be provided with an anti-priming device (not shown) of any suitable or usual construction.

The upper part of the lower vessel $a$ is connected by two or more pipes $d$ to a condenser $e$ which in one convenient form may be of the tubular variety containing an up-rising coil through which the gas first passes and then through a down-fall coil, but these coils are not illustrated in the drawings as their construction is well understood and it will also be clear that any other suitable form of condenser may be employed.

Connected with the down-fall coil of the condenser by the pipes $g$ is a cylindrical or other receiver $h$ in communication with the refrigerating coil or coils $i$ when such are employed, but it will be understood that the receiver itself may be adapted to act as the refrigerating or expansion vessel.

For the purpose of obviating the collection of water or other absorbent medium within the receiver and refrigerating coils or within either the receiver or the refrigerating coils I prefer to provide intermediate of the generating vessel $a$ and the condenser $e$ a separator $f$ of any suitable construction within which the gas and any liquid carried over thereby may be separated.

The lower vessel $a$ is filled to any desired height with the ammonia liquor, and the arrangement is such that when heat is applied to the vessel $a$ the gas forms in the upper part thereof and forces the liquor through the connecting pipe or pipes $c$ into the upper vessel $b$ so that only a small proportion of the liquor remains in the vessel $a$ at one time and the latter becomes, as it were, a kind of flash boiler continuously fed from the vessel $b$, so that there is an increased rate of evaporation with a resultant economy in the heat consumption. The gas passes by way of the pipes $d$ and separator $f$ into the condenser $e$ whence the now condensed anhydrous ammonia passes by gravity to the vessel $h$ and refrigerator coils $i$ with the result that at the end of the first operation there is weak liquor upon the generator side of the apparatus and liquid anhydrous ammonia upon the refrigerator side as is usual with apparatus of this nature.

Owing to the fact that a certain amount of liquor is carried into the upper vessel $b$ thereby taking with it the heat that has been imparted thereto it is preferable to insulate the upper vessel so that this heat may not be lost by radiation.

In the reverse operation of the apparatus the vessel $b$ is cooled by means of a cooling coil supplied with water through the pipes $u$, water jacket, current of air or other suitable means and the expanded gas passes from the refrigerator side of the apparatus in the reverse direction to that taken when the gas is generated, that is, through the chamber $h$, condenser coils, separator $f$, and the pipe or pipes $d$ into the lower vessel $a$ of the generator-absorber and is absorbed partly by the absorbent medium in the lower vessel $a$ and partly by that in the upper vessel, and owing to this dual arrangement of the apparatus it is found that the rate of absorption is very rapid as compared with apparatus of this class as hitherto constructed.

Even where a separator such as $f$ or other suitable device is adopted for preventing accumulation of water or weak liquor in the receiver and refrigerating coils (hereinafter referred to as the receiver) some liquid may be carried over with the gas, and it may therefore be desirable to provide means for emptying the receiver of any water that may have collected therein and returning the same to the generator. For this purpose I provide a pipe connection or pipe connections $o$ communicating with the lower part of the receiver or refrigerating coils and leading into a tank or suitable receptacle $p$, the tank being connected by a further pipe or tube $q$ with the lower vessel $a$ of the generator. The pipe connections $o$ and $q$ are adapted to be controlled respectively by the valves $r$ $s$, and as these valves are only required to be open or shut and are not needed for regulation they may be of the ordinary pin variety so that when required to be closed they may be screwed down tightly upon their seats and leakage will thus be obviated. When it is required to bring this apparatus into operation the valve $r$ is opened so that the liquid to be ejected from the receiver will pass into the tank or receptacle $p$ whereupon the valve $r$ is then closed and the valve $s$ opened and the liquid will be forced into the vessel $a$ either by the excess of pressure in the tank $p$ or by gravity, or by a combination of these causes. The usual siphon overflow pipe may also be provided and is shown at $t$.

Figure 4:
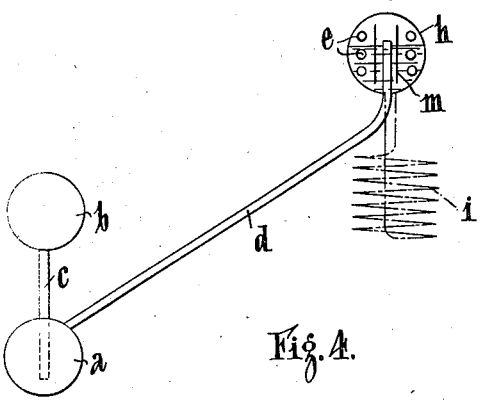
Fig. 4 is a diagrammatic view illustrating a modification.
Figure 2:
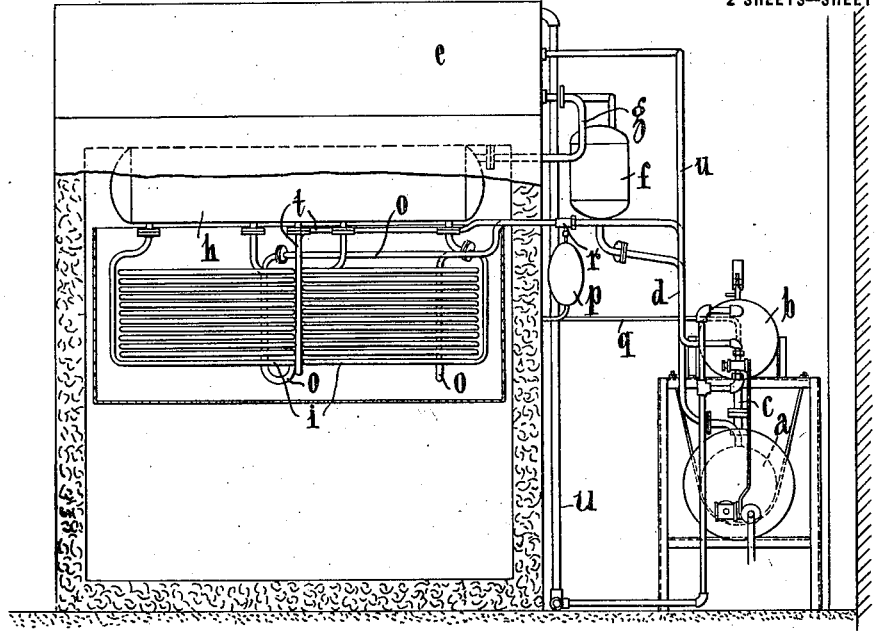
Figure 3:
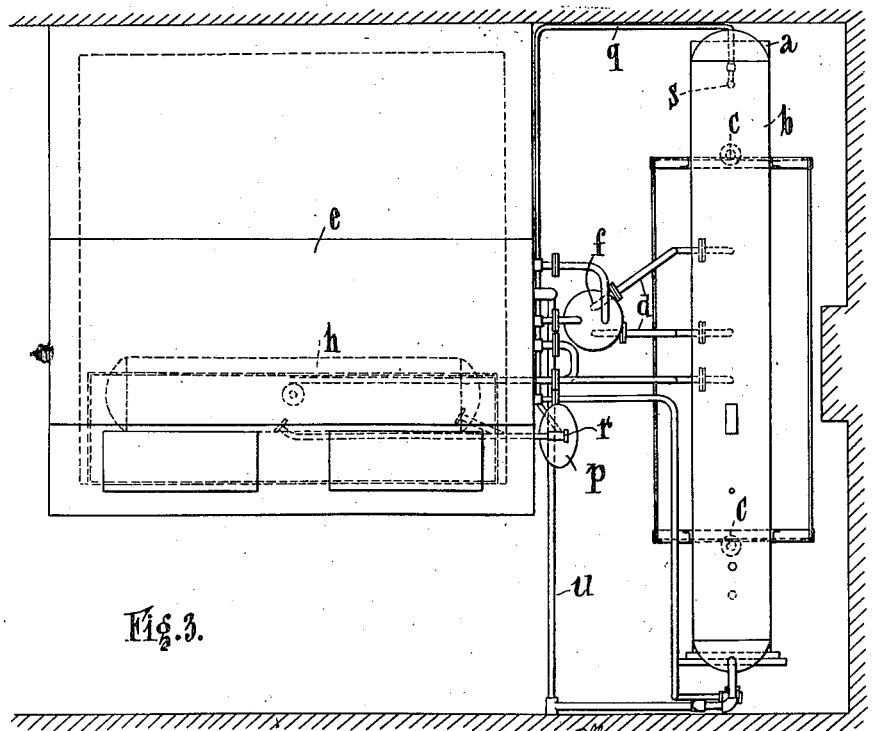
Fig. 3 is a plan.

In a modification of this part of the apparatus (illustrated in Fig. 4) which is particularly suitable when the condenser comprises a cylindrical or other vessel forming the receiver and within which the condenser tubes are located, the connecting pipe $d$ between the generator $a$ and the condenser-receiver $h$ may pass through the lower wall of the latter so as to extend toward the upper part of the condenser and this portion of the tube is inclosed by a sleeve $m$ extending nearly to the bottom of the condenser chamber where the heavier liquid, the accumulation of which is to be prevented, collects. The effect of this arrangement is that when the level of the liquid rises in the condenser to a point adjacent the top of the tube $d$ the liquid flows by gravity back into the generator but owing to the arrangement of the outer sleeve $m$ the liquid which will be so forced back, will be that which is collected at the bottom of the condenser, that is, the heavier liquid containing water.

It is to be understood that the details of construction hereinbefore described are given by way of example only and may be suitably modified depending upon the type of apparatus to which the invention is to be applied and the purpose for which the same is to be employed.

Having now described my invention what I claim as new and desire to secure by Letters Patent is:—

1. In refrigerating apparatus of the absorption type, a generator-absorber formed from two vessels arranged at different levels and communicating with one another and having the gas outlet in the lower vessel.

2. In refrigerating apparatus of the absorption type, a generator-absorber formed from two vessels arranged at different levels and connected together by one or more pipes extending from the lower part of the upper vessel into the lower vessel at a point adjacent to the lower part thereof and having the gas outlet in the lower vessel.

3. Refrigerating apparatus of the absorption type comprising in combination a generator-absorber formed from two vessels arranged at different levels and having the gas outlet in the lower vessel, one or more pipes or tubes extending from the lower part of the upper vessel and into the lower vessel at a point adjacent to the lower part thereof, means for heating the lower vessel, means for condensing the gas evolved during the heating operation and means for cooling the upper vessel of the generator-absorber.

4. Refrigerating apparatus of the absorption type comprising a generator-absorber formed from two vessels situated at different levels connected together and having the gas outlet in the lower vessel, means for heating the lower vessel, a receiver in communication with the gas outlet, means for condensing the gas in said receiver and means for cooling the upper vessel of the generator-absorber.

5. Refrigerating apparatus of the absorption type comprising a generator-absorber formed from two vessels situated at different levels connected together and having the gas outlet in the lower vessel, means for heating the lower vessel, a receiver in communication with the gas outlet, means for condensing the gas in said receiver, means for cooling the upper vessel of the generator-absorber, and means intermediate of the generator and receiver for minimizing the accumulation of absorbent medium in the receiver.

6. Refrigerating apparatus of the absorption type comprising a generator-absorber formed from two vessels situated at different levels connected together and having the gas outlet in the lower vessel, means for heating the lower vessel, a receiver in communication with the gas outlet, means for condensing the gas in said receiver, means for cooling the upper vessel of the generator-absorber, and means for removing from the receiver any absorbent liquor that may have accumulated therein and returning the same to the generator.

7. Refrigerating apparatus of the absorption type comprising a generator-absorber formed from two vessels arranged at different levels and connected by a pipe or pipes extending from the lower part of the upper vessel to a point adjacent to the lower part of the lower vessel and having the gas outlet in the lower vessel, means for heating the lower vessel of the generator-absorber, a receiver in communication with the gas outlet, means for condensing the gas in said receiver, means for cooling the upper vessel of the generator-absorber, a receptacle intermediate of and connected by pipes to the receiver and the generator-absorber and a valve in each of said connecting pipes.

In testimony whereof I have signed my name to this specification in the presence of two subscribing witnesses.

WALTER PFLEIDERER.

Witnesses:
Hy. Carnelley,
Wm. A. Shepperd.